(No Model.)
D. D. WHITNEY.
FIFTH WHEEL.
No. 370,718. Patented Sept. 27, 1887.
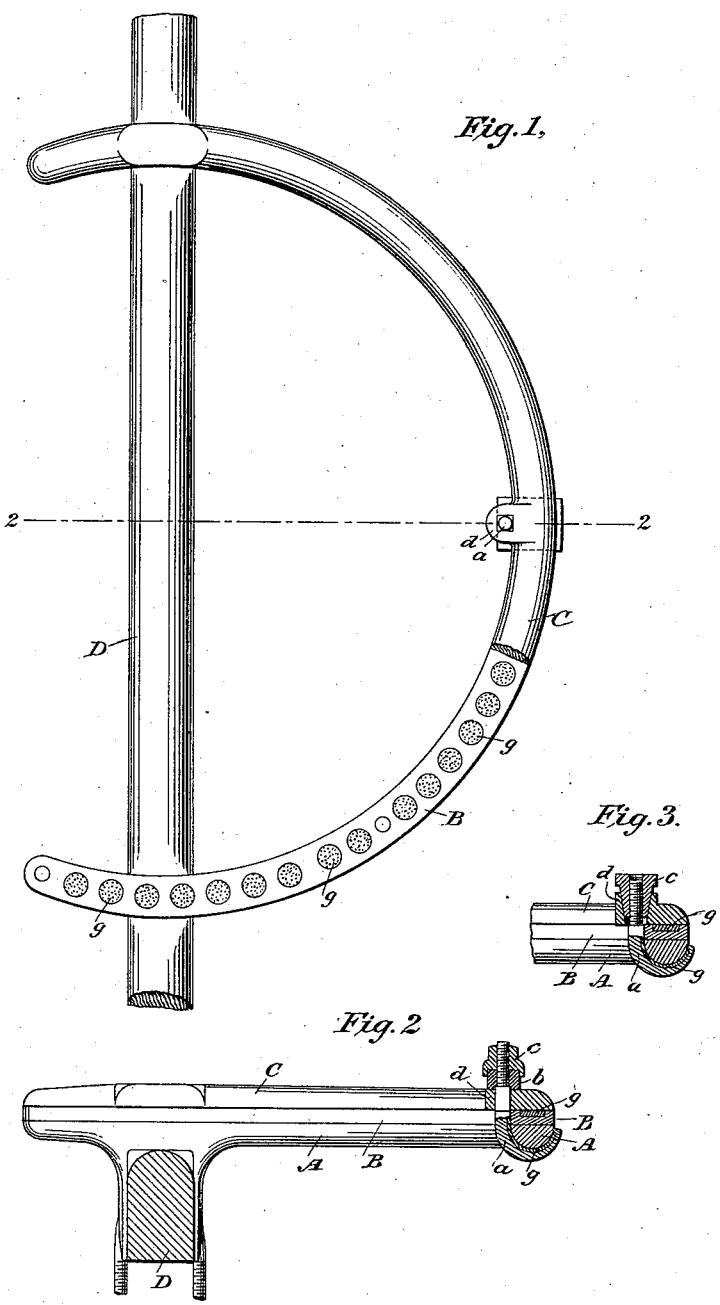
Witnesses
Geo. W. Breek
Carrie E. Ashley
Inventor
D. D. Whitney
By his Attorneys
Fowler & Fowler

UNITED STATES PATENT OFFICE.

DANIEL D. WHITNEY, OF CORNWALL, NEW YORK, ASSIGNOR OF ONE-HALF TO SPENCER WEART, OF JERSEY CITY, NEW JERSEY.

FIFTH-WHEEL.

SPECIFICATION forming part of Letters Patent No. 370,718, dated September 27, 1887.

Application filed November 6, 1886. Serial No. 218,171. (No model.)

*To all whom it may concern:*

Be it known that I, DANIEL D. WHITNEY, a citizen of the United States, residing at Cornwall, in the county of Orange and State of New York, have invented certain new and useful Improvements in Fifth-Wheels and Means for Lubricating the Same, of which the following is such a full, clear, and exact description as will enable any one skilled in the art to which it appertains to make and use the same, reference being had to the accompanying drawings, forming part of this specification.

It is well known that fifth-wheels are subjected to great wear by reason of the great weight which they are required to sustain, and that when worn away the plates rattle against each other, causing much noise, and by reason of this chattering the wear is increased. It is also a fact that fifth-wheels are difficult to lubricate, and that even when lubricated with oil this is liable to be forced from between the plates by the great pressure put upon them, so that the metal surfaces are brought into intimate contact with each other, increasing the friction and wear.

The object of my invention is to overcome these evils in a novel and highly useful manner.

The invention consists in a take-up clamp, to be hereinafter set forth, which is adjustable and can be made to hold the plates together, so as to prevent chattering, no matter to what extent they are worn, and, in fact, to prevent the aforesaid rattling whether wear has taken place or not; and it consists, further, in certain means for lubricating the plates at the surface of contact with a solid lubricant, which cannot be forced from between the plates by any stress, however great; in providing the take-up clamp also with this lubricant, and in certain details of construction, which will be hereinafter set forth, and pointed out in the claims.

Figure 1 is a plan view of a fifth-wheel embodying my invention. Fig. 2 is a section of said fifth-wheel on the line 2 2 of Fig. 1, and Fig. 3 is a section of a modified form of holding-clamp.

In the accompanying drawings, forming part of this specification, the same letters of reference indicate the same or corresponding parts in the several figures.

I have shown my invention as applied to a ring-plate fifth-wheel semicircular in form; but I wish it distinctly understood that I do not confine myself to any kind of a fifth-wheel, as my invention can be readily adapted to any form.

In the drawings, A represents the lower plate of a fifth-wheel, which may be attached to the axle D of the vehicle by clips in the ordinary manner.

C is a metal plate made of iron or hard steel, and coinciding in shape and form with the plate A. The aforesaid plate C is attached to the head-block and the reaches, from which depends the drop-stay, secured at its lower end by an extension of the king-bolt. This plate, therefore, is rigidly affixed to the body of the vehicle, and remains stationary. Between these two plates I interpose a soft-metal plate, B—such as brass or other metal—which soft-metal plate is provided with recesses, in which I place a solid lubricant. It is affixed to the plate A by bolts, or may be attached in any way found desirable. The lower plate, A, which is composed of soft iron, is therefore protected from wear, all of which is thrown upon the plate B by reason of its softness. The interposition of this plate serves of itself to diminish friction, in view of the fact that friction is less between dissimilar metals than it is between similar ones. The soft-metal plate B may be attached to the upper plate, if found desirable, without departing from my invention.

Extending from the upper plate, C, is a lug, *d*, having a perforation in it, through which passes a curved clamp, *a*, whose curved end embraces the lower plate, A, the other end carrying a nut, *c*, between which and the lug *d* is placed a rubber washer, *b*. As the plates wear away, the nut *c* may be adjusted to any position and thus hold these together with any degree of tension, the rubber merely serving to give it a certain degree of elasticity and compensate for the wear itself to a certain extent.

In Fig. 3 I have shown a modification of the clamp illustrated in Fig. 2, wherein I dispense with the use of the rubber *b*. In this latter figure the lug upon the plate C is raised to a slight extent above the upper surface of the plate, and has a conical hole in it, in which rests nut c, having a conical extension and angular head, as before. I consider this the preferred form of my clamp, in that it possesses certain advantages over the device shown in Fig. 2, one of which may be stated to be that it does not project so far above the body of the plate C, making a more elegant finish and being less in the way.

In a, at the surface of contact between the hook and the lower plate, A, I make recesses or channels, in which I place a solid lubricant, so that as the plate A passes through the clamp in its oscillations the latter will offer no resistance to its movements, and the wear between the two will be reduced to a minimum.

The soft-metal plates B, having the graphite composition embedded therein, may be manufactured and sold separately to the trade, so that where one by long and continued use becomes worn away another can be substituted for it; but in practice I believe that this will not be found necessary.

Having now fully set forth my invention, I desire to state that I do not limit myself to the exact form or construction shown, nor to the particular materials specified, as the same may be varied in many ways without departing from the spirit of my invention, and I reserve the right in practice, should I see fit, to make all those changes that fall within the scope of what I now desire to claim and secure by Letters Patent, which is—

1. In a fifth-wheel, the combination, with the upper and lower plates thereof, of an interposed soft-metal plate rigidly attached to the lower one, conforming in shape to said plates, and provided with recesses having a solid lubricant therein, for the purpose described.

2. The combination, in a fifth-wheel, of the plates A and C, a soft-metal plate, B, interposed between the same, having recesses filled with graphite or other solid lubricant, and a take-up clamp, as $a\,c$, hung from an extension of the plate C and embracing the plate A.

3. A take-up or clamp for fifth-wheels, a lug extending from one of the plates carrying the same, the other plate embraced thereby, and recesses in the clamp at the contacting surface with the latter plate, having a solid lubricant therein, for the purpose set forth.

4. In a fifth-wheel, the combination of the take-up or clamp, as $a$, embracing one of the plates, a conical nut, as $c$, co-operating with said clamp, and a lug or extension, as $d$, from the other plate, having a corresponding conical bearing for journaling said nut.

5. The combination, with the plates A and C of a fifth-wheel, of a soft-metal plate, B, of brass or other metal, interposed between the two, having recesses carrying a solid lubricant, such as graphite, and a take-up clamp, $a\,c\,d$, also having recesses in the part $a$ at the surface of contact with the plate A, filled with graphite or other solid lubricant, as set forth.

In testimony whereof I have hereunto set my hand and seal, this 5th day of November, 1886, in the presence of two subscribing witnesses.

DANIEL D. WHITNEY. [L. S.]

Witnesses:
A. C. FOWLER,
CHAS. D. FOWLER.